United States Patent

[11] 3,556,181

| [72] | Inventor | Eino J. Jouppi<br>Isabella, Minn. 55607 |
|---|---|---|
| [21] | Appl. No. | 747,707 |
| [22] | Filed | July 25, 1968 |
| [45] | Patented | Jan. 19, 1971 |

[54] DEVICE FOR DELIMBING FELLED TREES
12 Claims, 7 Drawing Figs.

[52] U.S. Cl. .................................................. 144/2,
144/309
[51] Int. Cl. ...................................................... A01g 23/02
[50] Field of Search .......................................... 144/2—21,
3—4, 34, 208—3.5, 309—34

[56] References Cited
UNITED STATES PATENTS
2,612,724  10/1952  Llewellyn ..................... 144/2

| 2,707,007 | 4/1955 | Shuff ............................ | 144/2 |
| 2,989,097 | 6/1961 | Bombardier ................. | 144/2 |
| 3,029,848 | 4/1962 | Bombardier ................. | 144/2 |

*Primary Examiner*—Gerald A. Dost
*Attorney*—Wicks and Nemer

ABSTRACT: A main frame having an extension together with a flexible carriage connected at the inner end to the main frame and having a multiplicity of cutting blades carried thereby and cable means carried by the main frame and the extension for holding the carriage substantially encompassing a felled tree in intimate and pressing contact whereby the blades sever limbs of a tree pulled through the carriage together with means for anchoring the holding means.

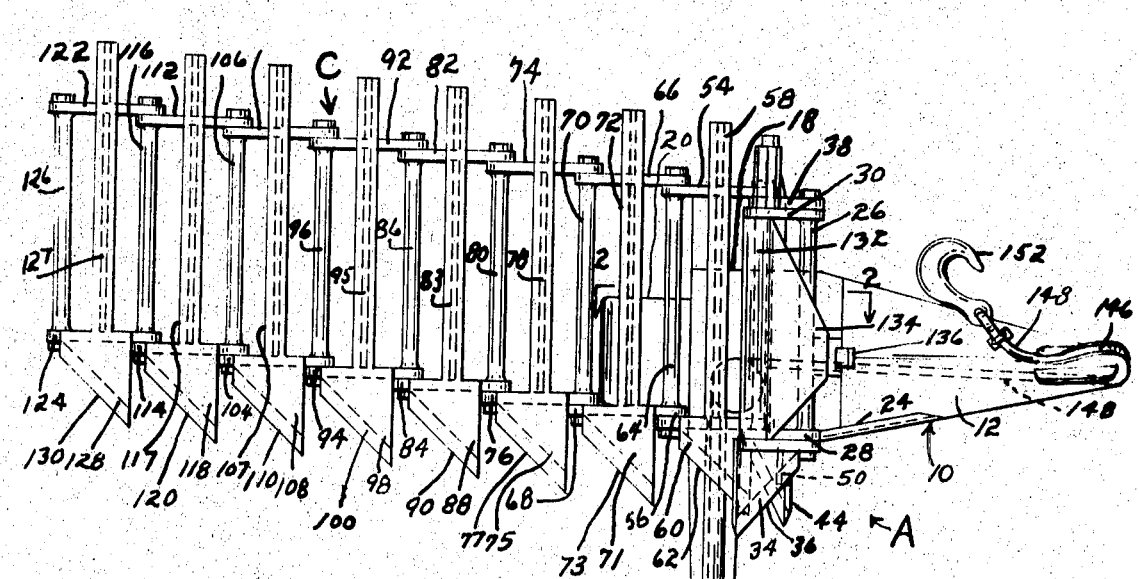
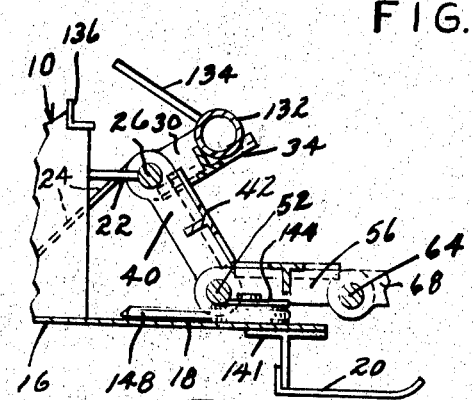
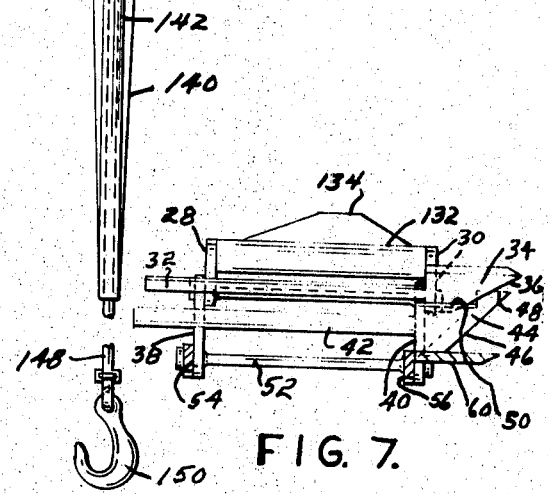
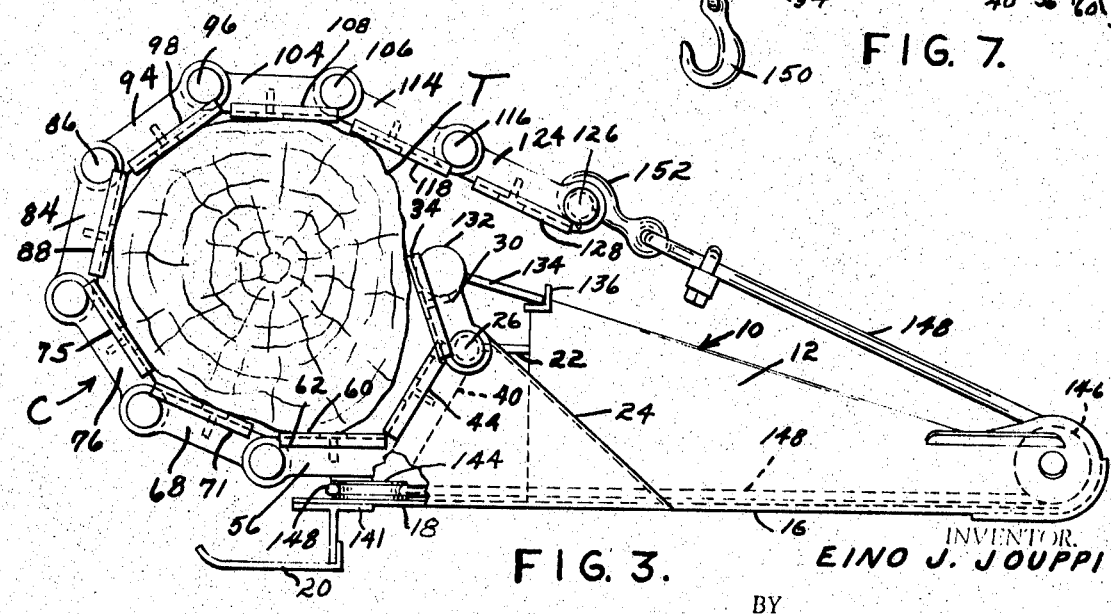

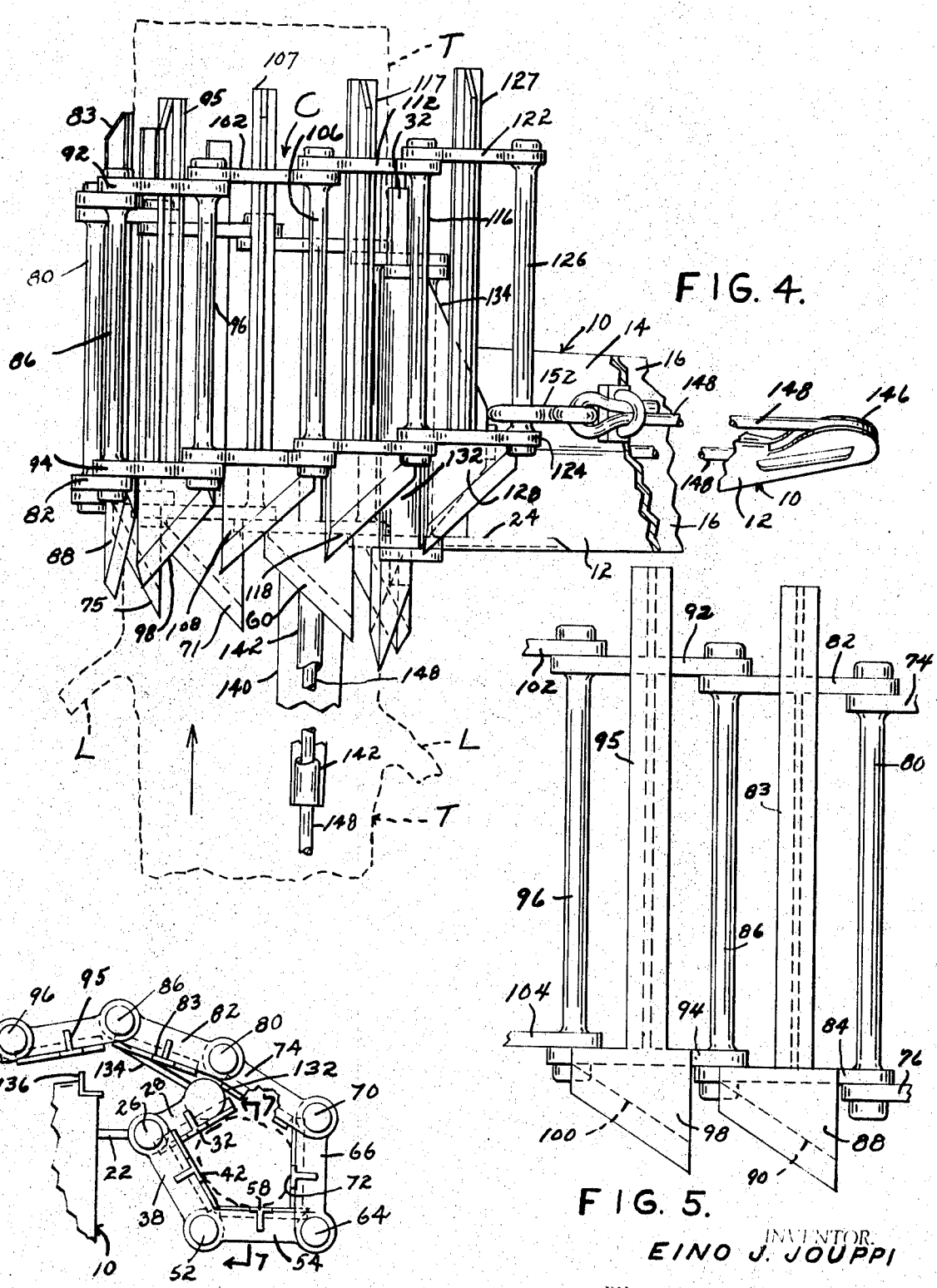

3,556,181

DEVICE FOR DELIMBING FELLED TREES

SUMMARY OF THE INVENTION

The invention relates to a device for delimbing felled trees and more particularly to a device which is portable by means of a single operator's lifting ability. It is an object of the invention to provide a tree delimber including a flexible carriage having a multiplicity of cutting blades. The inner end of the carriage is secured to the inner end of a main frame and is wrapped around a tree. The carriage is maintained upon the tree with the blades in pressing contact therewith by means of a cable extended along a control arm extending from the inner end of the main frame. The cable is positioned over a guide member on the inner end of the main frame and over a guide member on the outer end of the main frame with the end of the cable connected to the outer end of the carriage. With the opposite end of the cable anchored to a stump or the like, the carriage is automatically held in a tightened pressing engagement with the tree when the tree is pulled through the carriage. The limbs of the tree are cut by the blades carried by the flexible carriage. The carriage has a guide positioned in line with each of the cutting blades whereby the blades are held in correct position on the tree as the tree is pulled through the carriage.

These and other more detailed and specific objects will be disclosed in the course of the following specification, reference being had to the accompanying drawings, in which:

FIG. 1 is a top plan view of a device for delimbing felled tress embodying the invention and in a fully extended open condition.

FIG. 2 is a sectional view on the line 2-2 of FIG. 1.

FIG. 3 is a front elevational view of the delimber shown in operative position around a tree.

FIG. 4 is a top plan view of the delimber substantially as shown in FIG. 3 with a tree illustrated in broken lines, portions thereof being broken away.

FIG. 5 is an enlarged top plan view of a portion of the blade carriage.

FIG. 6 is a rear elevational view of the delimber showing the blade carriage drawn up and around a portion of a tree substantially smaller than that shown in FIGS. 3 and 4, the tree being illustrated in broken lines.

FIG. 7 is a view taken on the line 7-7 of FIG. 6.

Referring to the drawings in particular, the delimber A includes the main hollow frame 10 which is triangular in cross section and formed of the converging sidewalls 12 and 14 connected to the bottom 16. The bottom 16 is formed with the extension 18 to which is secured the support and skid member 20. Extending from the inner end of the main frame 10 is the central support 22, and connected to the inner end of the sidewall 12 of the main frame is the side support 24. The numeral 26 designates a horizontal cross pin rigidly mounted on the central support 22 and the side support 24.

Pivotally connected to the pin 26 at one end is the rear link 28 and at the other end the front link 30. Connected to the links 28 and 30 is the transverse guide 32, and connected to and extending outwardly from the link 30 is the blade 34 formed with the angularly disposed cutting edge 36. Further provided is the rear link 38 rigidly connected at its upper end to the outer end of pin 26 and the front link 40 rigidly connected at its upper end to the inner end of pin 26 and side support 24. The numeral 42 designates a transverse guide connected to the link 38 and the link 40, and connected to and extending outwardly from the link 42 is the blade 44 formed with the angularly disposed cutting edge 46. The upper edge 48 of the blade 44 is formed with the notch 50 adapted to receive the lower portion of the blade 34 when links 28 and 30 together with the blade 34 carried thereby are pivoted from the position of FIG. 3 to that of FIGS. 1, 2 and 6. Secured to the lower ends of the fixed links 38 and 40 is the cross pin 52, and pivotally connected at its inner end to the outer end of pin 52 is link 54. The link 56 is pivotally connected at its inner end to the inner end of pin 52. Secured to the links 54 and 56 is the transverse guide 58, and connected to and extending outwardly from the link 56 is the blade 60 formed with the angularly disposed cutting edge 62.

The numeral 64 designates a cross pin which is connected to the outer ends of the links 54 and 56, and pivotally connected at its inner end to the pin 64 at the outer end thereof is the link 66. A further link 68 is pivotally connected at its inner end to the pin 64. The outer ends of the links 66 and 68 are secured to the cross pin 70. Secured to the links 66 and 68 is the transverse guide 72. Connected to and extending outwardly from the link 68 is the blade 71 formed with the angularly disposed cutting edge 73. Pivotally connected at its inner end to the outer end of pin 70 is the link 74, and pivotally connected at its inner end to the inner end of cross pin 70 is the link 76. Secured to the links 74 and 76 is the transverse guide 78, and the cross pin 80 is secured to the outer ends of the links 74 and 76. Connected to and extending outwardly from the link 76 is the blade 75 formed with the angularly disposed cutting edge 77.

Further provided are the links 82 and 84 pivotally connected at the inner ends to the pin 80 with the outer ends of the links 82 and 84 connected by the cross pin 86. Connected to and extending outwardly from the link 84 is the blade 88 formed with the angularly disposed cutting edge 90. Secured to the links 82 and 84 is the transverse guide 83.

Additionally provided are the links 92 and 94 pivotally connected at the inner ends thereof to the cross pin 86 with the outer ends of the links 92 and 94 connected by the cross pin 96. Secured to the links 92 and 94 is the transverse guide 95. Connected to and extending outwardly from the link 94 is the blade 98 formed with the angularly disposed cutting edge 100. Similarly provided are the links 102 and 104 pivotally connected at the inner ends thereof to the pin 96 with the outer ends of the links 102 and 104 connected by the cross pin 106. Secured to the links 102 and 104 is the transverse guide 107. Connected to and extending outwardly from the link 104 is the blade 108 formed with the angularly disposed cutting edge 110. Links 112 and 114 are pivotally connected at the inner ends thereof to the cross pin 106 with the outer ends of the links 112 and 114 connected by the cross pin 116. Secured to the links 112 and 114 is the transverse guide 117. Connected to and extending outwardly from the link 114 is the blade 118 formed with the angularly disposed cutting edge 120.

Further provided are the outermost links 122 and 124 pivotally connected at the inner ends thereof to pin 116 with the outer ends connected by the outermost cross pin 126. Secured to the links 122 and 124 is the transverse guide 127. Connected to and extending outwardly from the link 124 is the blade 128 formed with the angularly disposed cutting edge 130.

Each of the blades described is in axial alignment with the companion guide with the flat surface of the blade in the same plane with the flat surface of the guide. The guide contacts the trunk and holds the blade in alignment upon the trunk. It will be seen that each of the links 40, 56, 68, 76, 84, 94, 104, 114 and 124 are positioned with the inner end on the inside surface of the adjacent link whereby the blades carried by the links are stepped progressively backward from the innermost link to the outermost link. Such construction and positioning of the blades provides progressive cutting of limbs extending from a tree which extend from the tree on substantially the same radii as the tree is forced through the blades as will be related in detail hereinafter in the description of the operation of the device A. The various links described provide supports for the blades and guide members.

The various pivotally connected links, skids and blades described above form a flexible carriage C which is easily positioned around a tree for delimbing as hereinafter set forth in detail.

The upper outer ends of the links 28 and 30 are connected by the transverse bar 132 from which extends the flange 134. The flange 134 abuts and is positioned against the stop shoulder 136 formed on main frame 10 as illustrated particularly in FIG. 3, when the links 28 and 30 carrying blade 34 are pivoted upwardly and in a direction away from links 38 and 40 to adapt to a tree of a larger size as in FIG. 3. With a tree of a smaller size the blade 34 may be pivoted to the position of FIG. 6 where the flange 134 is moved away from the stop 136, and the blade 34 and the links 28 and 30 are stopped in the position of FIG. 6 by means of the blade 34 abutting the notch 138 formed in the blade 44.

The numeral 140 designates an extension in the form of a control bar which is secured at its inner end 141 to the extension 18 of the main frame. The control bar 140 is normal to the longitudinal axis of the main frame 10 and the carriage C. Secured to the top surface of the bar 140 is the tubular member 142. A first guide in the form of a sheave 144 is rotatably secured on top of the extension 18, and a second guide in the form of sheave 146 is rotatably secured to the outer end of the main frame 10.

The cable 148 is positioned around the sheave 144 and out through the tubular member 142 with the hook 150 connected to the outer end of the cable. From the sheave 144 the cable extends through the main frame 10 and around the sheave 146 with the hook 152 connected to the outer end of the cable.

The delimber A is used in the following manner. A felled tree such as T is placed upon the carriage C with the carriage in the flat open condition shown in FIG. 1 and the tree positioned as close as possible to the fixed links 38 and 40. The carriage C is then brought upwardly and around the tree as illustrated in FIGS. 1, 3 and 4. The hook 152 is then engaged with the pin 126 or similar pin depending upon the diameter of the tree. The hook 150 is secured to an anchor (not shown) which may be a tree, stump or the like. A chain or the like is then securely attached by conventional well-known means to the tree at the portion of the tree adjacent outer ends of the skid members such as 117 and 127. The chain is attached to a tractor or some means of locomotion and operated whereby the tree is pulled through the carriage C with the cutting blades severing the limbs as the tree is forced through the carriage C. The control bar 140 maintains the longitudinal axis of the carriage C in a position normal to the longitudinal axis of the tree thereby preventing the carriage C from canting upon the tree as the tree is pulled through the carriage C.

In addition the greater the pull upon the cable 148 upon the anchor thereof due to the pulling of the tree than the carriage, the greater the pull of the hook 152 upon the pin 126 thereby firmly holding the carriage and the blades thereof upon and encompassing the tree trunk. As a result the blades are held in close pressing contact with the tree trunk, and the limbs such as L are cut at the trunk. As the tree is pulled through the device the diameter of the tree reduces. The carriage is automatically taken up and closes upon the decreasing trunk size due to the pull of the hook 152 upon the pin 126 through the cable 148. As the tree is pulled through the carriage, the guides contact the tree and hold the cutting blades in position for cutting.

The skid 20 allows the device to be moved easily and placed under a tree. The skid also supports the inner portion of the carriage C and the inner portion of the main frame off of the surface upon which the device is positioned.

It is understood that suitable modifications may be made in the structure as disclosed, provided such modifications come within the spirit and scope of the appended claims. Having now therefore fully illustrated and described my invention,

I claim:

1. A device for delimbing felled trees comprising:
   a. a main frame;
   b. an extension carried by said main frame;
   c. a flexible carriage connected at the inner end to said main frame and having a multiplicity of cutting blades carried thereby;
   d. means carried by said main frame and said extension for holding said carriage substantially encompassing a felled tree in intimate and pressing contact therewith whereby said blades sever limbs of a tree pulled through said carriage;
   e. means for anchoring said holding means;
   f. said extension being normal to the longitudinal axis of said carriage to prevent canting of a tree within the carriage;
   g. said cutting blades being positioned along one edge of said carriage; and
   h. said means for holding said carriage substantially encompassing and in intimate pressing contact with a tree when the tree is pulled through the carriage including a flexible member carried by said extension and said main frame for engagement at one end with an anchor and engagement at the other end with the outer end of the carriage.

2. The device of claim 1 in which said extension is in the form of an arm.

3. The device of claim 2 in which at least one of said blades is offset relative to the other blades.

4. The device of claim 3 in which said flexible member is passed over a first guide carried by the inner end of said main frame and a second guide carried by the outer end of said main frame, said flexible member extended along and carried by said extension.

5. The device of claim 1 in which said flexible member is passed over a first guide carried by the inner end of said main frame and a second guide carried by the outer end of said main frame, said flexible member extended along and carried by said extension.

6. A device for delimbing felled trees comprising:
   a. a main frame;
   b. an extension carried by said main frame;
   c. a flexible carriage connected at the inner end to said main frame and having a multiplicity of cutting blades carried thereby;
   d. means carried by said main frame and said extension for holding said carriage substantially encompassing a felled tree in intimate and pressing contact therewith whereby said blades sever limbs of a tree pulled through said carriage;
   e. means for anchoring said holding means; and
   f. said means for holding said carriage substantially encompassing and in intimate pressing contact with a tree when the tree is pulled through the carriage including a flexible member carried by said extension and said main frame for engagement at one end with an anchor and engagement at the other end with the outer end of the carriage.

7. The device of claim 6 in which at least one of said blades is offset relative to the other blades.

8. A flexible carriage for use in delimbing felled trees comprising:
   a. a multiplicity of pairs of spaced opposed supports;
   b. means pivotally connecting said supports;
   c. a blade carried by each of said pairs of supports;
   d. guide means carried by said supports for guiding a tree through the carriage and against said blades whereby the limbs are cut from the tree; and
   e. each of said pairs of supports and the blade carried thereby being offset relative to the others.

9. The device of claim 8 in which said blades are offset progressively one from the other.

10. The device of claim 9 in which the cutting edge of each of said blades is formed obliquely to the major axis of the guide means.

11. The device of claim 10 in which the guide means includes bar members.

12. The device of claim 8 in which the cutting edge of each of said blades is formed obliquely to the major axis of the guide means.